Aug. 22, 1950     H. F. COX, JR     2,519,355
SCORING ROLLER
Filed April 1, 1946
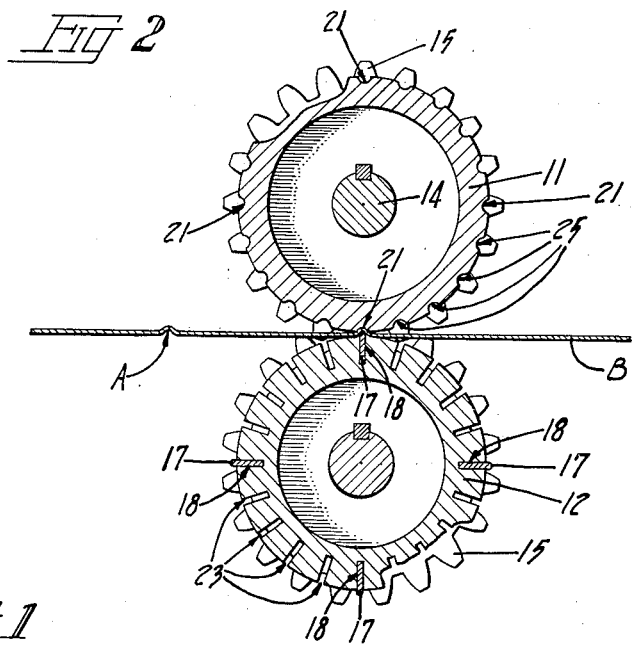
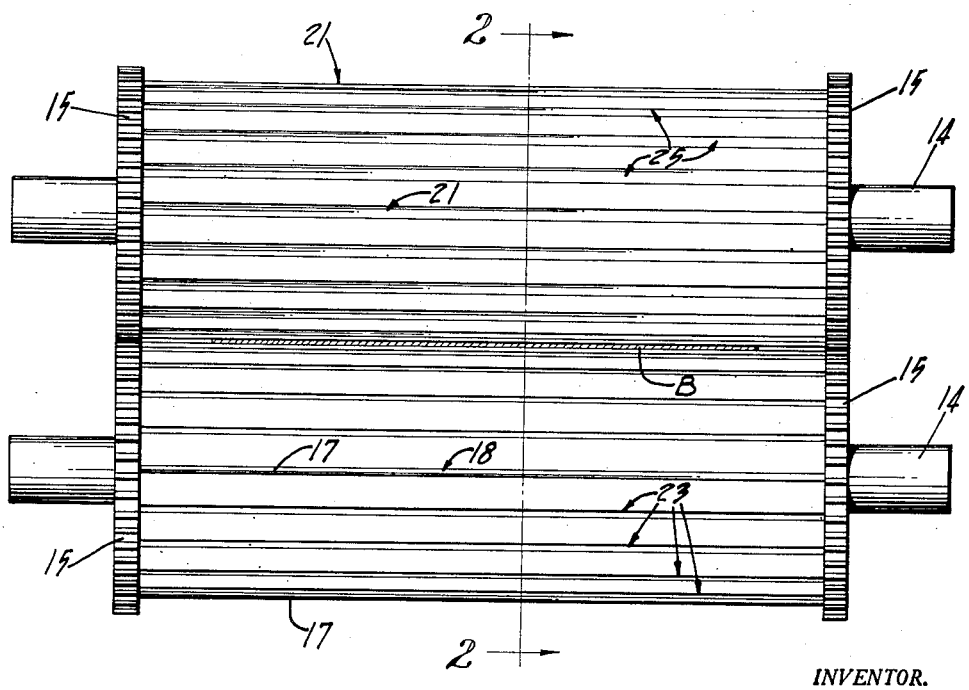
INVENTOR.
Herbert F. Cox Jr.
BY Ivan D. Thornburgh
Charles H. Erne
ATTORNEYS Patented Aug. 22, 1950

2,519,355

UNITED STATES PATENT OFFICE 2,519,355

SCORING ROLLER

Herbert F. Cox, Jr., New York, N. Y., assignor to American Can Company, New York, N. Y., a corporation of New Jersey Application April 1, 1946, Serial No. 658,785

4 Claims. (Cl. 93—58.1)

The present invention relates to sheet working mechanism such as scoring rollers and the like and has particular reference to raised die and depressed die rollers having one or more spare or supplemental pockets, channels or grooves for properly holding a tool or working element thus permitting quick replacement of an element when wear and tear renders it unsatisfactory.

In scoring sheet material, such as fibre or metallic sheets from which containers or cans are made, as by partially cutting through or creasing or beading the material, a co-operating pair of scoring rollers may be used between which the sheets pass. One of these rollers usually carries one or more projecting elements such as scoring blades while the cooperating roller is formed with a like number of scoring recesses or grooves. When the blades or the grooves wear out, a new roller or a new set of rollers must be substituted for the worn out rollers or the rollers must be removed from the machine and new channels or grooves cut in the rollers to restore them to usefulness. Such handling of the rollers entails considerable trouble and expense both in the work of removing the worn out rollers and installing the new ones or of cutting the new grooves in the old rollers.

The instant invention contemplates overcoming this difficulty by providing additional or spare pockets, channels or grooves in the scoring rollers for immediate use upon failure of the pockets, channels or grooves being used, permitting installation of the scoring elements without removing the rollers from the machine.

An object of the invention is the provision of a scoring roller for scoring sheet material wherein the periphery of the roller is formed with a plurality of supplemental or additional pockets, channels or grooves for subsequent use when and as they are required in substitution of worn out pockets, channels or grooves so that time and expense in changing rollers may be reduced to a minimum.

Numerous other objects and advantages of the invention will be apparent as it is better understood from the following description, which, taken in connection with the accompanying drawings, discloses a preferred embodiment thereof.

Referring to the drawings:

Figure 1 is a front elevation of a pair of cooperating scoring rollers embodying the instant invention; and Fig. 2 is a sectional view taken substantially along the line 2—2 in Fig. 1, with parts broken away.

As a preferred embodiment of the instant invention the drawings illustrate a pair of cooperating feeding and scoring rollers for producing transverse score or crease lines A (Fig. 2) in predetermined spaced relation in a strip or web B of fibre material such as used in the manufacture of bodies for fibre milk containers or the like. Two scoring rollers preferably are used, an upper or raised die roller 11 and a lower or depressed die roller 12 between which the web B of fibre material is passed for the scoring operation. These rollers are formed as hollow cylindrical or tubular bodies. The outer peripheries of the rollers preferably are spaced apart just enough to grip and feed the web.

The rollers 11, 12 are mounted on rotatable parallel shafts 14. One of these shafts is a driving shaft which is rotated in any suitable manner. The rollers are rotated in synchronism and in opposite directions for cooperative action, by meshing gears or gear wheels 15 (see also Fig. 1), secured to the ends of the rollers.

The lower roller 12 is provided with a plurality of scoring blades 17 which are disposed in spaced relation around the outer periphery or surface of the roller. The drawing shows four of these scoring blades 17 although any number may be used depending upon the spacing of the score lines A in the web B. These blades are set into scoring or blade channels 18 which pass through the outer surface and which extend the full length of the roller. The blades are pressed tightly into the channels and thus are held against displacement by the friction set up in the tight fit. The blades extend beyond the outer surface of the roller a predetermined distance depending upon the depth of the crease or score line to be produced in the web B of fibre material.

The upper roller 11 is provided with a plurality of cooperating grooves 21 for cooperation with the scoring blades 17. These produce the score lines A in the web B as the rollers rotate and feed the web between them. There are four of these cooperating grooves 21 to correspond with the number of scoring blades 17 carried in the lower roller 12 and these grooves come into register with the blades as the rollers rotate in synchronism.

Provision is made for compensating for the wearing out of the blades 17 in the lower roller 12 or of the cooperating grooves 21 in the upper roller 11. This prolongs the usefulness of these rollers. For this purpose the lower roller 12 is formed with a plurality of supplemental channels 23 for new blades. These supplemental channels extend in through the outer surface of the roller and are identical with the scoring channels 18 being disposed between adjacent blades in the roller. The drawing shows four spare supplemental channels between each pair of blades although any number which the space between the blades will accommodate may be used. Each supplemental channel in each set, there being four sets since there are four blades, bears a predetermined spaced relation to its corresponding channel in an adjacent set so that the proper spacing of the score lines A in the web B will be maintained.

Hence when the blades 17 in the roller 12 become worn and need replacing it is merely necessary to remove the worn blades and insert new ones in the next set of new supplemental channels 23. Thus a new blade is provided with a new seat and the same tightness of fit is insured which was obtained in the original channel. Removal of old blades usually destroys the usefulness of the channels from which they were removed. These channels therefore are discarded as to subsequent use.

With a new set of blades in new tight fitting seats or channels 23, the roller is just as good as new. In this manner the usefulness of the roller can be prolonged until all of the spare channels 23 have been used. Thus in the case of the roller shown in the drawings where there are provided four sets of spare or supplemental channels 23, the usefulness of the roller may be prolonged to five times the life of a roller provided with only one set of blades and channels.

In the same manner the upper roller 11 is formed with four sets of supplemental or spare cooperating grooves 25 located between the grooves 21. The grooves in this roller are spaced to register with the channels 23 in the lower roller. Hence when a new set of blades 17 are installed in a new set of channels 23 in the lower roller, they automatically come into register with a new set of grooves 25 in the upper roller 11.

In case the cooperating grooves wear out before the blades, the upper roller may be adjusted on its axis by the necessary rotation so that the old blades in the lower roller will coact with the next new set of grooves in the upper roller. If the blades wear out first, the roller may be adjusted on its axis to bring a new set of blades into registration with the old cooperating grooves. Thus it will be seen that there are many combinations obtainable.

To insure such flexibility the channels and grooves 18, 21 and the supplemental channels and grooves 23, 25 in the rollers 11, 12 preferably are located in the rollers in peripherally spaced relation to the teeth in the gear wheels. As best shown in Fig. 2 the scoring grooves 21, 25 in roller 11 are located in register with the teeth of the gear wheel 15. The blade channels 18, 23 in the lower roller 12 are aligned with the spaces between the teeth. There is thus one channel or groove for each tooth in each of the rollers.

Hence to bring a new blade 17 in alignment with a used groove 21 or 25 it is merely necessary to raise the upper roller 11 enough to unmesh the gears 15 and then rotate the roller one tooth, and return the roller so that the gears will mesh again. In this manner accuracy of alignment between the grooves in the one roller and the blades in the other roller may always be maintained.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. Sheet working mechanism comprising a raised die roller, a depressed die roller, means for rotating said rollers in synchronism and in opposite directions, a first pocket formed in the cylindrical periphery of said raised die roller for retaining a die tool therein with a portion of said tool projecting outwardly from said periphery to provide a raised die member, a second and supplemental pocket in said periphery spaced from said first pocket, a depressed die element in the cylindrical periphery of said depressed die roller and adapted to cooperate with said raised die member in working said sheets as the latter pass between said rollers, and a supplemental depressed die element spaced from said first element, said supplemental element being adapted to cooperate with a die tool inserted and retained in said supplemental pocket when the tool in said first pocket is removed.

2. Sheet working mechanism comprising a raised die roller, a depressed die roller, means for rotating said rollers in working relation to sheets passed between said rollers, a first channel formed in the cylindrical periphery of said raised die roller for retaining a die blade therein with a portion of said blade projecting outwardly from said periphery to provide a raised die member, supplemental channels formed in said cylindrical periphery spaced from said first channel and from each other, a first depressed die element in the cylindrical periphery of said depressed die roller adapted to cooperate with said raised die member in working said sheets, and supplemental depressed die elements spaced from said first element and from each other in the periphery of said depressed die roller, said supplemental depressed die elements being aligned with correlative supplemental channels in the first mentioned roller each being thereby adapted to cooperate with a blade retained in the correlative channel of the raised die roller when the blade in said first channel is removed.

3. Sheet working mechanism comprising a raised die roller, a depressed die roller, a gear mounted fixedly and axially relative to each of said rollers for rotating said rollers in synchronism, a first channel formed in the outer periphery of said raised die roller, a die blade seated in said channel with a portion projecting outwardly of said periphery, a supplemental channel spaced along the periphery from said first channel for retaining a die blade therein, a first die groove formed in the periphery of said depressed die roller and adapted to cooperate with the outwardly projecting portion of said blade to work a sheet passing therebetween, and a supplemental die groove spaced along the periphery of said depressed die roller from said first die groove and adapted to cooperate with a die blade retained in the correlative supplemental channel of said raised die roller when the blade in said first channel is removed, said first channel or groove and said supplemental channels or grooves being spaced apart on the peripheries of their respective rollers by an angular distance equal to a multiple of the angular distance between the teeth of said meshing gears.

4. Sheet working mechanism comprising a raised die roller, a depressed die roller, a gear mounted fixedly and axially relative to each of said rollers for rotating said rollers in synchronism, a first channel formed in the outer periphery of said raised die roller, a die blade seated in said channel with a portion projecting outwardly of said periphery, a supplemental channel substantially identical to and spaced from said first channel in said periphery, a first die groove formed in the periphery of said depressed die roller and adapted to cooperate with the outwardly projecting portion of said blade to work a sheet passing therebetween, and a supplemental die groove substantially identical to said first die groove in the periphery of said depressed die roller and adapted to cooperate with a die blade retained in the supplemental channel of said raised die roller when the blade in said first channel is removed, said first channel or groove and said supplemental channel or groove being spaced apart on the peripheries of their respective rollers by an angular distance equal to a multiple of the angular distance between the teeth of said meshing gears, whereby one of said rollers and its gear may be removed from working relation with the other roller and gear and be replaced in an angularly advanced position equal to said multiple of angular distance to bring either an old but useful die blade into working alignment with said supplemental die groove, or a new blade inserted in said supplemental channel into working alignment with said first die groove.

HERBERT F. COX, Jr.

REFERENCES CITED

The following references are of record in the file of this patent:

UNITED STATES PATENTS

| Number | Name | Date |
|---|---|---|
| 372,624 | Jaeger | Nov. 1, 1887 |
| 1,053,087 | Cooke | Feb. 11, 1913 |
| 1,148,670 | Fedders | Aug. 3, 1915 |
| 1,486,977 | Lindgren | Mar. 18, 1924 |